3,314,865
ELECTROLYTIC DEPOSITION OF ACTINIDE OXIDES
John H. Kleinpeter, Richland, and George Jansen, Jr., Kennewick, Wash., assignors to the United States of America as represented by the United States Atomic Energy Commission
No Drawing. Filed Nov. 26, 1963, Ser. No. 326,303
1 Claim. (Cl. 204—1.5)

ABSTRACT OF THE DISCLOSURE

A process of electrolytically depositing pure actinide oxides by cathodic deposition from a molten alkali metal chloride while passing the chlorinating gas through the melt by using graphite electrodes of which the cathode has been coated with pyrolytic carbon to ease removal of the actinide oxides.

---

This invention deals with the electrolytic deposition of actinide oxides and in particular with their deposition from a molten salt solution. The so-called salt cycle process, for instance, which is covered, among others, by the assignee's U.S. Patent No. 3,011,865, granted to Glenn E. Benedict et al. on Dec. 5, 1961, broadly deals with the dissolution of neutron-irradiated uranium oxide fuel in molten alkali metal chloride by the introduction of a chlorinating agent and the subsequent electrolysis of the fused solution formed for cathodic deposition of uranium dioxide or a uranium dioxide-plutonium dioxide mixture.

For the electrodeposition step of the process just described, graphite electrodes have been used heretofore. These, however, have certain drawbacks. They are too porous, and the actinide oxide deposits in the pores so that a mechanical bond is formed between the oxide and the electrode. Consequently, in removing the deposit from the electrode, a clean separation is not obtained. Graphite particles and pieces break off from the electrode together with the deposit, which results in a carbon contamination of the actinide oxide and also in a damaged, non-reusable, electrode. Furthermore, the electrodes become contaminated by the radioactive actinide oxides deposited in the pores, which causes complications in the disposal of these electrodes.

It has been considered to remove the electrodes from the deposit by mechanical means; this, however, is a tedious procedure and also a hazardous one on account of the deposited radioactivity.

It is an object of this invention to provide a process for the electrodeposition of actinide oxides on praphite electrodes which allows an easy and clean removal of the deposite from the electrode.

It is another object of this invention to provide a process for the electrodeposition of actinide oxides on graphite electrodes in which the deposit, after removal from the electrode, is contaminated to a negligible amount by graphite of the electrode.

It is also an object of this invention to provide a process for the electrodeposition of actinide oxides on graphite electrodes in which the electrodes can be reused for a great number of times after removal of the deposit.

It is still another object of this invention to provide a process for the electrodeposition of actinide oxides on graphite electrodes in which the electrodes are contaminated to a negligibly low degree by radioactive material deposited in the pores, so that there do not exist any disposal problems.

It is finally an object of this invention to provide a process for the electrodeposition of actinide oxides on graphite electrodes in which a loss of actinide oxides by deposition in the pores of the electrodes is reduced to a minimum.

It has been found that, when the graphite electrodes to be used for the electrodeposition of the actinide oxide are precoated with a layer of pyrolytically deposited graphite, all the drawbacks enumerated above are eliminated. The actinide oxide deposite then can be removed cleanly and easily by simply mechanically breaking the deposit off with a sharp blow from a hammer; the electrode then remains undamaged and can be reused. This layer of pyrolytically deposited graphite has the additional advantage that it protects the electrode from damage that is often caused at the interface between molten salt and gas layers.

The pyrolytical graphite can be obtained by any means known to those skilled in the art. Thermal decomposition of hydrocarbons is the customary procedure and need not be described here. The layer does not have to be extremely thick. A 0.25-mil thick layer has been found sufficient, but in many cases a thickness of about 0.1 inch was preferred.

In the following, an example is given to illustrate the advantage of this invention.

EXAMPLE

Uranium dioxide was dissolved in a molten eutectic mixture of lithium chloride and potassium chloride, and two 3-foot long, 1.5-inch wide electrodes were immersed in the solution obtained. The electrodes were made of graphite on which pyrolytic graphite had been deposited by methane decomposition as a 0.25-mil thick layer. The temperature of the molten solution was maintained at between 530 and 560° C., and a direct electric current was passed through the solution. About 25 pounds of uranium dioxide were deposited on the cathode, which resulted in a layer of 0.5 inch thickness.

After completion of the electrolysis, the cathode was removed from the bath and allowed to cool; the deposit was then removed by splitting it lengthwise with a sharp 53-degree wedge mounted on a hydraulic press. The uranium dioxide did not adhere firmly to the layer of pyrolytic graphite and thus could be separated cleanly from the electrode without damaging the latter. The uranium dioxide deposit was analyzed and found to contain an average carbon contamination of 25 p.p.m; the ⅛-inch thick layer immediately adjacent to the electrode had a carbon content of only 50 p.p.m.

A parallel test was carried out using the same conditions, however a graphite cathode that had not been coated with the pyrolytic graphite layer. In this case, the deposit of uranium dioxide adhered so strongly to the electrode that, when removal was attempted with the wedge mounted on the hydraulic press, the electrode itself split longitudinally without there being a separation of the uranium dioxide from the graphite. In the latter case, the carbon content of the deposit ranged between 100 and 3000 p.p.m., which is above the maximum limits of 100 p.p.m.

It will be understood that the invention is not to be limited to the details given herein but that it may be modified within the scope of the appended claim.

The embodiments of the invention in which an exclusive property or privilege is claimed are defined as follows:

A process of electrolytically depositing pure actinide oxides by cathodic deposition, comprising heating a graphite electrode; pyrolytically decomposing hydrocarbon in contact with said heated electrode, whereby graphite forms and deposits in pores of the graphite electrode and in the form of a layer on said electrode; dissolving actinide oxide material in molten alkali metal chloride while passing a chlorinating gas therethrough; immersing the pyrolytically coated graphite electrode and another graphite electrode in the molten salt solution; passing a direct electric current through said salt solution, making the coated electrode the cathode, whereby pure actinide oxide deposits on said cathode; removing said cathode with the deposit of actinide oxide from the salt solution; cooling said cathode; and removing the deposit from the cathode by mechanical means.

References Cited by the Examiner

UNITED STATES PATENTS

| | | | |
|---|---|---|---|
| 1,470,300 | 10/1923 | Szarvasy | 204—294 X |
| 2,883,708 | 4/1959 | Sem | 204—294 X |
| 3,011,865 | 12/1961 | Benedict et al. | 204—1.5 X |

REUBEN EPSTEIN, *Primary Examiner.*